United States Patent [19]

Hoffmann et al.

[11] Patent Number: 5,308,434

[45] Date of Patent: May 3, 1994

[54] SEALING DEVICE FOR A PRESSURE CASE USED IN A ROTARY MACHINE

[75] Inventors: Martin Hoffmann, Tangstedt-Wilstedt; Dieter Pallas, Lentfoehrden, both of Fed. Rep. of Germany

[73] Assignee: Peters Maschinenfabrik GmbH, Fed. Rep. of Germany

[21] Appl. No.: 907,694

[22] Filed: Jul. 1, 1992

[30] Foreign Application Priority Data

Jul. 1, 1991 [CH] Switzerland ............. 01946/91

[51] Int. Cl.⁵ .......................... B29C 53/22; B31F 1/20
[52] U.S. Cl. ............................ 156/472; 156/210; 425/369
[58] Field of Search ............. 156/382, 470–473, 156/210, 462; 34/242; 493/418, 424, 450, 454, 463; 425/303, 369, 396; 423/303, 369, 396

[56] References Cited

U.S. PATENT DOCUMENTS

| 2,672,640 | 3/1954 | Peterson et al. | |
|---|---|---|---|
| 2,989,026 | 6/1961 | Gardner et al. | 34/242 |
| 3,849,907 | 11/1974 | Lynch | 34/242 |
| 4,261,784 | 4/1981 | Saito | |
| 4,600,202 | 7/1986 | Schaeffler et al. | |
| 5,110,396 | 5/1992 | Harris | 156/382 |

FOREIGN PATENT DOCUMENTS

| 2938484 | 3/1981 | Fed. Rep. of Germany |
| 2330926 | 6/1977 | France |
| WO86/05252 | 9/1986 | PCT Int'l Appl. |

Primary Examiner—Michael W. Ball
Assistant Examiner—Richard Crispino
Attorney, Agent, or Firm—Hill, Steadman & Simpson

[57] ABSTRACT

A sealing device, which is situated between a rotary cylinder and the opposite edge of a wall of a pressure case, is used in a rotary machine and comprises a seal fitted over its whole length along an edge of a wall, which is parallel to the axis of rotation of the cylinder, and the wall is shifted toward the cylinder by a pressing arrangement so as to enable the seal to be applied against the cylinder. Specifically, the seal has the shape of at least one lengthwise brush with the bristles, which consist of a relatively flexible and heat-resistant material, which is preferably a synthetic material.

9 Claims, 2 Drawing Sheets

SEALING DEVICE FOR A PRESSURE CASE USED IN A ROTARY MACHINE

BACKGROUND OF THE INVENTION

The present invention is directed to a sealing device for a pressure case used in a rotary machine, especially for a machine fabricating corrugated board.

In a machine for fabricating corrugated board, a sheet of cardboard is fed into a pair of superimposed corrugating rollers, which rollers are rotating in opposite directions and cause a corrugation of the cardboard sheet. Glue is applied or coated on the top of the flutes of the corrugated cardboard sheet by means of a gluing roller as the sheet is being held in contact with the lower corrugating roller. Thereupon, a glue-coated cardboard sheet is provided with a covering sheet by means of a pressing cylinder, which is running also in the opposite direction with regard to the lower corrugating roller.

In order to achieve a good quality of the cardboard produced, it is essential to keep the sheets thus corrugated in permanent contact with the corrugating flutes of the lower corrugating roller during the application of the glue and until the covering sheet has been pressed against the corrugated sheet, for example, by a lower pressing cylinder. A presently used solution consists of encasing the gluing device as well as the rear part of the lower and upper corrugating rollers and the pressing cylinder in a case within which additional pressure is to be built up with a view of having the paper pressed against the corresponding rollers or cylinders. This solution involves the problem of tightness throughout the length between the rotary cylinder and the opposite lateral edges of the case.

According to the presently used solution, the case parts are arranged opposite the pressing cylinder including a wall having the shape of a cylinder portion joined at its lower edge with an axle situated underneath the pressing cylinder. This wall is supposed to envelope the pressing cylinder almost as far as the point or line where it is in touching contact with the corrugated rollers. The wall has the shape of a cylinder portion and is strengthened by vertical arc-shaped ribs and/or horizontal cross members. The wall can be moved toward the pressing cylinder by pressing means, for example, shifting spindles. In order to achieve the tightness and sealing in the area, the upper edge of this wall is extended by means of a lateral tongue of a flexible material, such as a material sold under the trade name "TEFLON". This tongue is oblique and turned outwardly with regard to the wall. In this way, when the wall is moved toward the pressing cylinder, the flexible tongue will tangentially touch the pressing cylinder very close to the touching line between the cylinder and the lower corrugating roller shortly before the covering sheet will contact the corrugated sheet. The additional air pressure built up within the case is then expected to press the flexible tongue to a certain extent against the pressing cylinder, thereby improving the seal or tightness of the case.

However, practical use has revealed that this tightening or sealing tongue undergoes uneven wear over its whole length, thus, entailing non-neglectable losses of pressure. Therefore, the sealing tightness is unreliable. Turbulent air might accumulate on either side of the tongue close to the rotary cylinder and, thereby, cause the tongue to vibrate and to emit intense whistling noises, which are particularly annoying for the operators working close to and around the machine.

In a similar way, the upper lateral case edge is arranged opposite the upper corrugating roller and includes a lateral plate fitted on joints or pivots and directed obliquely downward. The plate carriers throughout its length a tightening seal shaped as a lateral bar of Teflon material. In this way, if the plate is lifted by underlying means, it is possible to apply the Teflon sealing bar against the corrugations of the upper roller. Springs included in the lifting means enable small diameter variations of the corrugating roller due to the corrugation types or structure. The bar also has a certain width and a curved contact surface for allowing to compensate for small translatory movement of the upper corrugated roller with regard to the lower corrugated roll. This translatory movement is inherent to the function of the machine.

As may easily be understood, the hardness of the Teflon necessary for insuring tightness is unable to reduce noisy vibrations caused by the bar rubbing against the corrugations. Moreover, the uneven wear of the contact surface also causes undesirable pressure losses.

SUMMARY OF THE INVENTION

The object of the present invention is to provide a sealing device for a pressure case used in a rotary machine. The sealing device comprises a tightening seal arranged between a fixed edge of a wall and an opposite rotary cylinder, and the seal is expected to wear down much slower and more regularly in order to, thus, insure permanent and reliable sealing throughout the length of the lateral edge, even with particularly broad machines. Similarly, the design and arrangement of the constituent parts should be such that possible vibrations can no longer entail excessive noises.

These objects are reached by an improvement in a sealing device arranged between a rotary cylinder and the opposite edge of a wall of a pressure case used in a rotary machine, the device comprises a seal fitted over its whole length along the edge of the wall, which is parallel to the axis of rotation of the cylinder, the wall is shifted toward the cylinder by pressure means to enable the seal to be applied against the cylinder. The improvement is the fact that the seal has the shape of at least one lengthwise brush with flexible and heat-resistant bristles, between which captured dust has a felt-like effect enhancing the tightness of the seal. The bristles making up the brush are advantageously made of a synthetic material marketed under the trade name "NYLON".

Workshop tests have shown that numerous dust particles, which are always present in such a machine, will be caught by the brush and form, among the bristles, a kind of felt for augmenting the initial tightness of the brush with regard to the overpressure existing within the case. The felting effect will not change the brush elasticity, which enables a certain withdrawal of the seal in the case of a possible covering paper over thickness passing therebeneath. The passing of paper of various thickness without modification of the position of the seal support, as well as the easy insertion of the leading edge of the paper when the machine starts running, is an advantage of such a sealing arrangement.

The tightening seal can advantageously be made of two brushes arranged to be parallel and close to one another and acting as a kind of labyrinth in order to maintain a two-stage overpressure. Such a double seal also allows, with its larger contact surface, to compensate possible movement of the cylinder with regard to the case edge and vice-versa.

If the wall supporting the seal is arranged opposite the pressing cylinder and appears in the form of a cylindrical portion or arcuate segment hinged at its lower edge on a stud or axle, it might be useful to have the angle of the arcuate length of a crosswise arc-shaped section or segment of the wall be in a range of between 45° and 75° and to have the seal shifted above a line connecting a center of rotation of the pressing cylinder and the center of rotation of the positioning levers belonging to this cylinder. With the pressing cylinder in the lower position, the sheet infeed is facilitated by the enlargement of the slot between the seal and the pressing cylinder. With the cylinder radius passing through the contact line, the brush-shaped seal is able to form an angle with the radius in a range of between 10° and 45° and, preferably, 25° and is oriented in the rotation direction of the cylinder. The means for pressing the seal against the cylinder acts preferably at a point situated between a fourth and a third part of the arcuate length of the wall, as measured from the upper edge, which supports the seal. In this way, the vibrations transmitted to the device by the cylinder rotating against the seal are reduced and once more provided a reduced potential noise source.

With the seal fitted on the downwardly slanting plate, which is connected by the hinge to the lateral upper edge of the case opposite to the upper corrugating roller, the seal may be made of a double-brush directed almost perpendicularly against the roller.

Other advantages and features of the invention will be readily apparent from the following description of the preferred embodiments, the drawings and claims.

DESCRIPTION OF THE PREFERRED EMBODIMENTS

Figure 1:
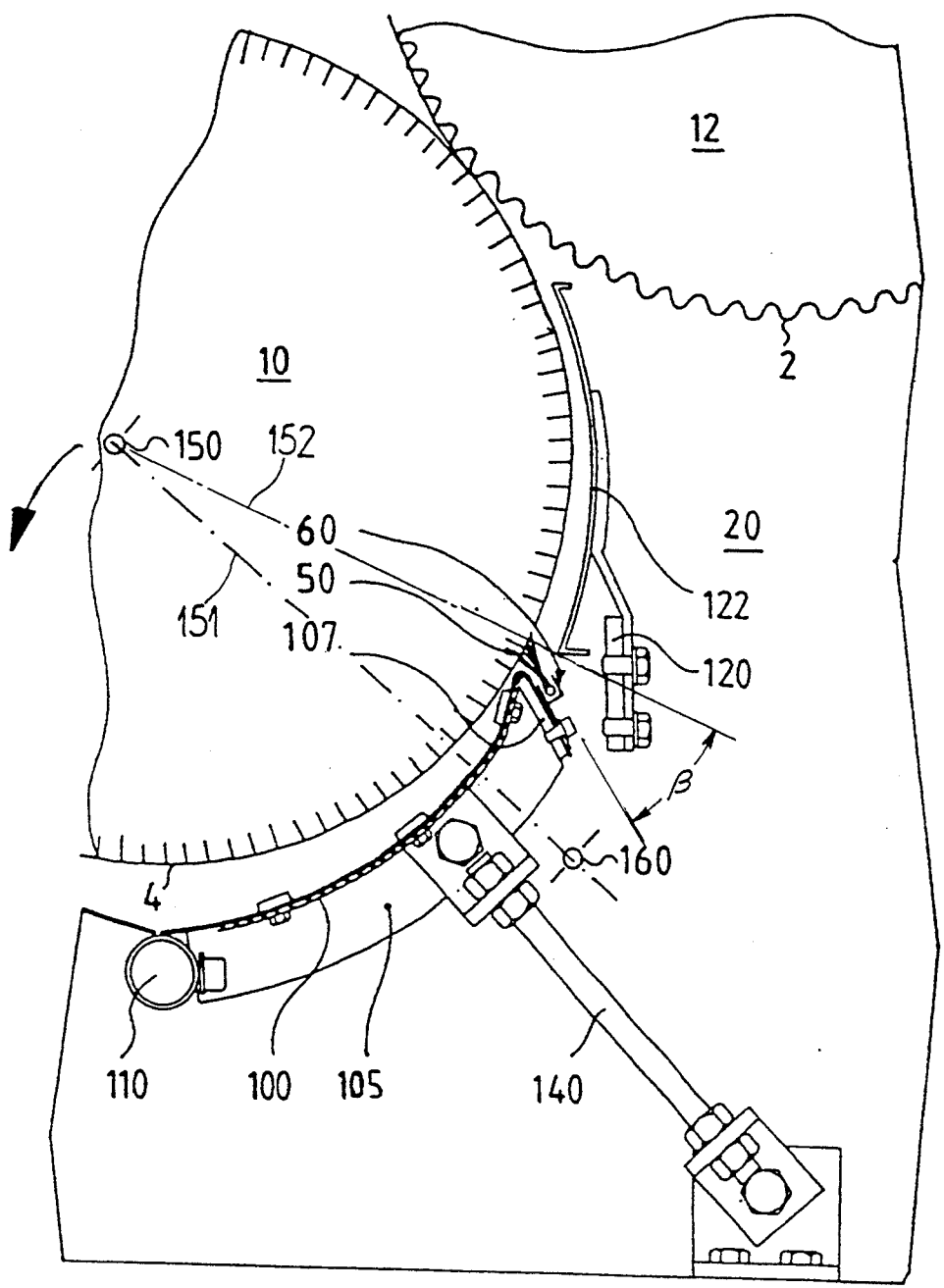
FIG. 1 is a schematic cross sectional view of a first arrangement for forming a seal with a pressing cylinder.
Figure 2:
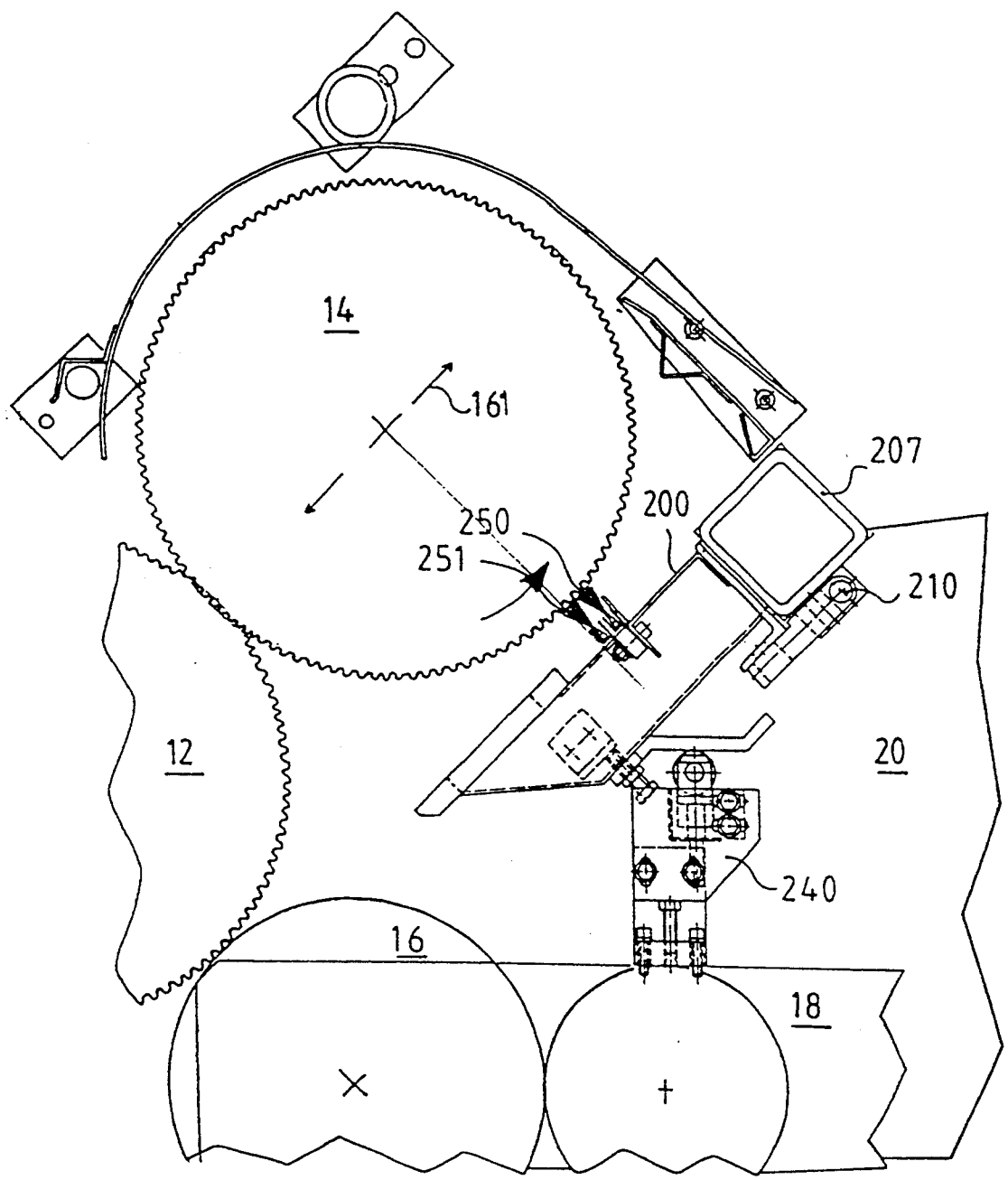
FIG. 2 is a schematic cross sectional view of a second way of forming a seal with an upper corrugating roller.

The principles of the present invention are particularly useful when incorporated in a seal, generally indicated at 50 in FIG. 1, for a case 20 surrounding portions of a lower or first corrugating roller 12, a pressing cylinder 10 of FIG. 1, and also portions of an upper or second corrugating roller 14 (see FIG. 2).

As illustrated in FIG. 1, the lower corrugating roller 12 has touching contact with a pressing cylinder 10. A first sheet of paper 2 has been corrugated by being forced into the corrugations of the lower roller 12 by the upper corrugating roller 14 (see FIG. 2). The sheet of paper 2 is carried by the corrugations of the lower corrugating roller 12 and has the upper surfaces of the flutes or loops coated with glue from a gluing roller 16 (FIG. 2) which is dipped into a glue basin 18. A covering paper sheet 4 is carried by the rotating pressing cylinder 10 and is laid onto the corrugated paper sheet 2 and adheres thereto. In order to improve the application of the corrugated paper sheet against the lower corrugating roller 12, the rear area of the cylinder 10 and the rear area of the corrugating roller 12, as well as any rear area of the upper corrugating roller 14, and the gluing device are assembled with the case 20, which contains an overpressure of air or other gases. For a better understanding of FIG. 1, only the wall 100 of the case 20, which is close to the pressing cylinder 10, has been represented. The tightness or seal between the two cylinders is insured by their tight contact. On the other hand, a special sealing device 50 is foreseen between the rotary cylinder 10 and the opposite edge 107 of the wall 100 of the case 20.

As shown by the illustration, the wall 100 situated close to the pressing cylinder 10 has the shape of a cylindrical portion or segment of a cylinder. A lower edge of this wall 100 is hinged on a horizontal stud 110 in such a way as to allow an upper edge 107 to be proximate the cylinder 10 and the seal 50 which is carried by the edge 107 to be in contact with the cylinder 10. The wall 100 can, preferably, be provided with ribs 105 and/or cross members on its rear side. More especially so, and in accordance with the invention, this movable wall 100 has approximately reduced dimensions in order to limit the amplitude of possible inner oscillations. However, the upper edge 107 is, in all cases, situated above a line 151 connecting a center of rotation 150 of the pressing cylinder 10 and a center of rotation 160 of the positioning lever (not represented) for the pressing cylinder 10. As shown by the illustration, the angle of the arc, which defines the crosswire section of the wall 100, is contained within a range of between 45° and 75°, and is approximately 60° in the illustration.

The seal 50 has the shape of a lengthwise brush fitted on a support 60, which is secured on the edge 107 of the wall 100. The brush 50 consists of bristles made of a flexible material, which is resistant to the heat generated by the continuous rubbing against the rotating pressing cylinder 10. Preferably, the bristles of the brush are made of a synthetic plastic material marketed under the designation of "Nylon". The brush 50 can be slanted with regard to the cylinder radius 152 passing through its contact point in the rotation direction of the cylinder with an angle B in a range of between 10° and 45° and preferably 25°.

In practical use, board dust always appearing on such a type of machine will penetrate between the bristles of the brush and bring about a formation of a felt-like material which will enhance the sealing nature of the seal. Moreover, on account of the flexibility inherent in this type of seal, it is possible to run covering paper of different thicknesses without modifying the position of the wall 100 and, therefore, of the edge 107 supporting the seal 50. Additionally and equally owing to this flexibility, it is possible to easily insert the front edge of the covering paper when the machine starts running or else to have a temporary overthickness in the run, such as at a location of a splice linking two successive reels of covering paper.

The seal 50 having the shape of the brush operates silently and suppresses the vibrations between the rotary cylinder 10 and the fixed wall 100 as an origin of noise and mechanical fatigue occurring within the components. In addition, the seal 50 will eliminate, additionally, any hazard or traces of the seal on the paper. The brush is to wear down slowly and regularly insuring lasting tightness of the seal.

The pressing means 140 provide their effect at a point situated at about a quarter of the arc length of the wall 100 as measured from the upper edge 107. Thus, it presses rather close to the edge 107 and enables a more accurate application of the pressing force. The pressing means 140 consist, in the present case, of a threaded rod that extends from a base fixed on the floor and a rib 105 of the wall 100, and more or less presses the wall 100 toward the cylinder 10. Of course, other means, such as springs, might also be used.

The area situated between the seal 50 and the contact point between the cylinder 10 and the corrugated roller 12 previously protected by a much longer, though also overhanging, wall is surrounded by a fixed cover 122 which is permanently connected to a cross member or bar 120.

FIG. 2, as mentioned before, illustrates the upper corrugating roller 14 engaging with the lower corrugating roller 12, as well as the gluing roller 16 dipping into a glue basin 18 to apply glue to a sheet corrugated and carried by the roller 12. The upper edge of the pressure case 20 is actually a crossbar 207. A downwardly slanted plate 200, which carries the seal, is connected for free rotation to the crossbar 207 by a row of hinges 210. Lifting means 240, including springs, allow a free lifting of the plate 200 toward the corrugating roller 14 and, thereby, apply a seal elastically against the roller 14.

According to the invention, the tight seal will seal the air overpressure and consist of two parallel brushes 250 and 251, which are mounted close to one another along the plate 200, for example, to extend parallel to the upper corrugated roller 14. Both brushes are oriented in the direction of the roller, possibly with a slight angle in the rotation direction of the roller.

The double-configuration allows, firstly, to keep the overpressure more efficiently owing to the two-stage labyrinth effect and, secondly, to compensate the translatory movement of the upper roller 14 with regard to the lower roller 12, which is necessary for proper functioning of the machine and is represented by the arrows 161 in FIG. 2. Furthermore, this type of brush-shaped seal also allows absorbing the slight diameter variations due to the various types of corrugation.

Even though the tightening or sealing device is described within the context of a rotary machine for producing corrugated board, it may also be applied to any other machine comprising a cylinder rotating close to a fixed edge of an overpressure case. Numerous improvements may be added to the device within the limits of the invention.

Although various minor modifications may be suggested by those versed in the art, it should be understood that we wish to embody within the scope of the patent granted hereon all such modifications as reasonably and properly come within the scope of our contribution to the art.

We claim:

1. In a rotary machine for producing corrugated board using a pressing cylinder coacting with a first corrugating roller to press a sheet on a corrugated sheet on the first corrugating roller, said pressing cylinder being mounted by positioning levers for pivotable movement around a center of rotation, said machine having a sealing device situated between the pressing cylinder and an opposite edge of a wall of a pressure case, said sealing device including a seal member fitted over its whole length along the edge, which extends parallel to a rotary axis of the cylinder and said seal member being positioned between the corrugating roller and a line connecting the rotary axis of the pressing cylinder and the center of rotation of the positioning levers, said wall being mounted for shifting toward the cylinder, pressing means for shifting the wall toward the cylinder so as to enable the seal member to be applied against the cylinder, the improvements comprising the seal member having the shape of at least one lengthwise brush with bristles consisting of a flexible and heat resistant synthetic material and the wall being an arc-shaped segment of a cylindrical portion and being hinged at a lower edge on a stud, the arc-shaped segment having an angular length in a range of between 45° and 75°, and the pressing means acting at a point on the wall in a range of between one-fourth and one-third of the length of the arc-shaped segment as measured from the seal member.

2. In a rotary machine according to claim 1, which includes a second corrugating roller and a second seal member mounted on a plate connected by hinges to a lateral edge of the pressure case opposite the second corrugating roller, said second seal member consisting of a double row of brushes with bristles extending approximately perpendicular against the second corrugating roller.

3. In a rotary machine according to claim 2, wherein the bristles of the first-mentioned seal member extend at an angle in a range of 10° to 45° with a radius of the pressing cylinder passing through a point of contact with the first-mentioned seal member.

4. In a rotary machine according to claim 1, wherein the bristles of the seal member extend at an angle in a range of 10° to 45° with a radius of the pressing cylinder passing through the point of contact with the seal member.

5. In a rotary machine for producing corrugated board using a first corrugating roller coacting with a second corrugating roller, said machine having a sealing device situated between the second corrugating roller and an opposite edge of a plate of a pressure case, said sealing device including a seal member fitted over its whole length along the edge, which extends parallel to a rotary axis of the second corrugating roller, said plate being mounted by a hinge on a lateral edge for shifting toward the second corrugating roller, pressing means for shifting the plate toward the second corrugating roller so as to enable the seal member to be applied against the second corrugating roller, the improvements comprising the seal member being a double brush having a pair of lengthwise brushes with bristles consisting of a flexible and heat resistant synthetic material, said double brush being mounted on said plate to extend almost perpendicularly against the second corrugating roller.

6. In a rotary machine for producing corrugated board using a rotary cylinder coacting with a first corrugating roller, said machine having a sealing device situated between the rotary cylinder and an opposite edge of a wall of a pressure case, said sealing device including a seal member fitted over its whole length along the edge, which extends parallel to a rotary axis of the cylinder, said wall being mounted for shifting toward the cylinder, pressing means for shifting the wall toward the cylinder so as to enable the seal member to be applied against the cylinder, the improvements comprising the seal member having the shape of at least one lengthwise brush with bristles consisting of a flexible and heat resistant synthetic material, the wall being an arc-shaped segment of a cylindrical portion and being hinged along a lower edge on a stud, said arc-shaped segment having an angular length in a range of between 45° and 75°, said pressing means acting at a point on said wall in a range of between one-fourth and one-third of the length of the arc-shaped segment as measured from the seal member.

7. In a rotary machine according to claim 6, wherein said bristles form an angle in a range of 10° and 45° with a radius of the cylinder at a point of contact with the seal member.

8. In a rotary machine according to claim 7, wherein said angle is 25°.

9. In a rotary machine according to claim 7, wherein said angular length is 60°.

* * * * *